(12) United States Patent
Usui et al.

(10) Patent No.: US 12,007,363 B2
(45) Date of Patent: Jun. 11, 2024

(54) MEASURING METHOD AND MEASURING DEVICE

(71) Applicant: KABUSHIKI KAISHA TOSHIBA, Tokyo (JP)

(72) Inventors: Takashi Usui, Saitama (JP); Kazuo Watabe, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 132 days.

(21) Appl. No.: 17/459,627

(22) Filed: Aug. 27, 2021

(65) Prior Publication Data

US 2022/0146457 A1    May 12, 2022

(30) Foreign Application Priority Data

Nov. 9, 2020 (JP) .................. 2020-186553

(51) Int. Cl.
*G01N 29/14* (2006.01)
*G01N 29/44* (2006.01)

(52) U.S. Cl.
CPC ........... *G01N 29/14* (2013.01); *G01N 29/449* (2013.01); *G01N 2291/0289* (2013.01)

(58) Field of Classification Search
CPC ............... G01N 29/14; G01N 29/449; G01N 2291/0289; G01N 29/07; G01N 29/11; G01N 2291/0258; G01N 2291/106; G01N 29/043; G01N 2291/0232
See application file for complete search history.

(56) References Cited

U.S. PATENT DOCUMENTS

| | | | |
|---|---|---|---|
| 2018/0070170 A1* | 3/2018 | Nakadai | H04R 3/005 |
| 2018/0101167 A1* | 4/2018 | DehghanNiri | G01N 29/4427 |
| 2022/0082377 A1 | 3/2022 | Usui | |

FOREIGN PATENT DOCUMENTS

| | | |
|---|---|---|
| EP | 3 598 065 A1 | 1/2020 |
| JP | 2014-13172 A | 1/2014 |
| JP | 2018-155662 A | 10/2018 |
| JP | 2019-194541 A | 11/2019 |
| WO | WO 2021/240817 A1 | 12/2021 |

OTHER PUBLICATIONS

T. Kamakura et al., "Parametric array and its characteristics," J. of Acoustical Soc. of Japan, vol. 74, No. 6, pp. 345-352 (2018).

* cited by examiner

*Primary Examiner* — Xin Y Zhong
(74) *Attorney, Agent, or Firm* — Finnegan, Henderson, Farabow, Garrett & Dunner, LLP

(57) ABSTRACT

A measuring method in an embodiment includes detecting elastic waves generated in a structural object formed of a solid material in a non-contact manner and estimating a position of an occurrence source of the elastic waves on the basis of information regarding an intensity of a signal of the detected elastic waves.

14 Claims, 11 Drawing Sheets

MEASURING METHOD AND MEASURING DEVICE

CROSS-REFERENCE TO RELATED APPLICATION

This application is based upon and claims the benefit of Japanese Patent Application No. 2020-186553, filed Nov. 9, 2020; the entire contents of which are incorporated herein by reference.

FIELD

Embodiments described herein relate generally to a measuring method and a measuring device.

BACKGROUND

For example, in structural objects such as bridges, fatigue cracks may occur due to aging in some cases. Fatigue cracks progress over time and structural objects deteriorate. As a method for detecting the deterioration of a structural object, position evaluation analysis by means of an acoustic emission (AE) method has been proposed. In an AE method, elastic waves generated along with the growth of fatigue cracks in a material are detected as a voltage signal (that is, an AE signal) using an AE sensor having a piezoelectric element. In position evaluation analysis based on an AE method, in principle, it is possible to estimate a two-dimensional position associated with a position of an occurrence source in which fatigue cracks have occurred by means of three or more sensors installed on a surface of a structural object. However, in position evaluation analysis based on an AE method in the related art, the use of a contact type AE sensor is assumed. Thus, a measuring device including an AE sensor needs to be fixed in contact with a structural object which generates elastic waves and an object to be measured, a measurement range, or a measurement environment are limited in some cases.

DETAILED DESCRIPTION

Figure 1:
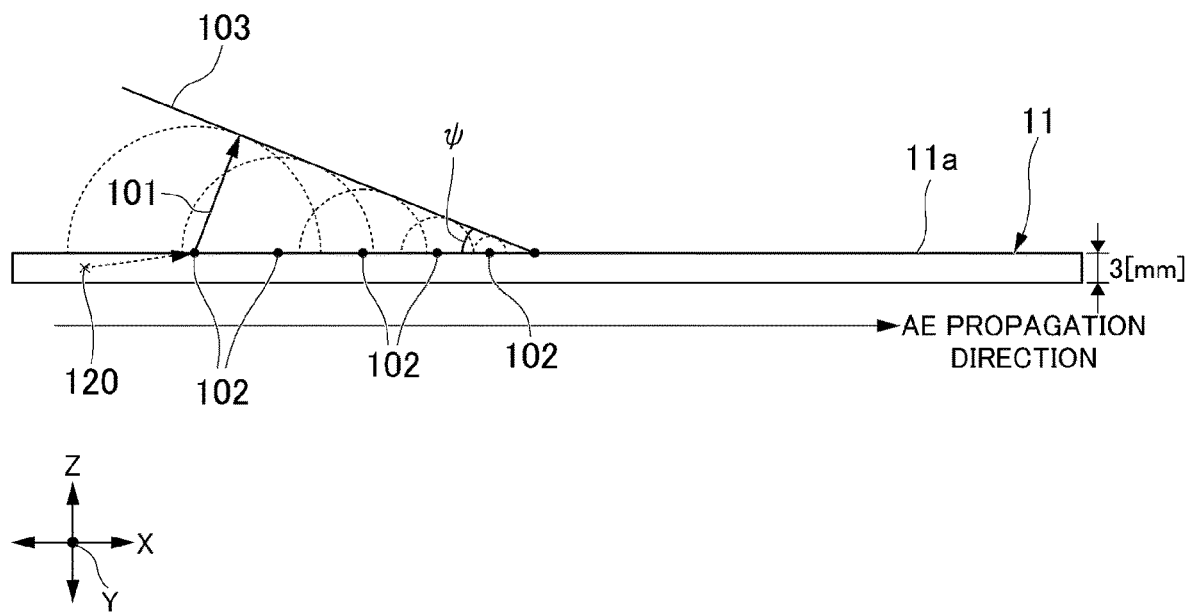
FIG. 1 is a side view for explaining a measuring method in a first embodiment.

A measuring method and a measuring device in an embodiment will be described below with reference to the drawings. In the following description, constituent elements having the same or similar functions will be denoted by the same reference numerals. In addition, duplicate description of the constituent elements having the same or similar functions may be omitted in some cases.

First, the principle of generating and propagating elastic waves in a structural object 11 to be measured will be described in brief. As illustrated in FIG. 1, elastic waves such as Lamb waves and Rayleigh waves propagating at a velocity $v_{ae}$ in the structural object 11 formed of a solid material are radiated from a surface 11a of the structural object 11 into the air as sound waves (elastic waves) 101. The sound waves 101 diffuse into the air at a velocity $v_{air}$. More specifically, Lamb waves (elastic waves) mainly vibrate particles of the solid material of the surface 11a and a point sound source 102 is generated in the surface 11a. The sound waves 101 are radiated from the point sound source 102 into the air. The point sound source 102 moves in a propagation direction parallel to the surface 11a at a velocity $v_{ae}$ specific to the solid material. The sound waves 101 produced by the moved point sound source 102 form a wavefront 103 having the same phase on a line inclined to have a prescribed angle T from the surface 11a toward the air side. The angle $\Psi$ is expressed by the following Expression (1).

$$\psi = \arcsin\left(\frac{v_{air}}{v_{ae}}\right) \qquad (1)$$

Hereinafter, two directions parallel to the surface 11a of the structural object 11 and orthogonal to each other are referred to as an "X direction" and a "Y direction" and a direction parallel to a thickness direction of the structural object 11 and orthogonal to the X direction and the Y direction is referred to as a "Z direction." For example, it may be assumed that the structural object 11 is a plate made of aluminum and a thickness of the structural object 11 is 3 [mm]. The elastic waves propagating in the solid material include two types such as p waves which are longitudinal waves and s waves which are transverse waves. When the structural object 11 is a thin plate such as a plate having a thickness of 3 [mm], reflected p waves and reflected s waves are excited due to the reflection at an end surface of the plate and guided waves called Lamb waves (elastic waves) are formed as a whole.

Figure 2:
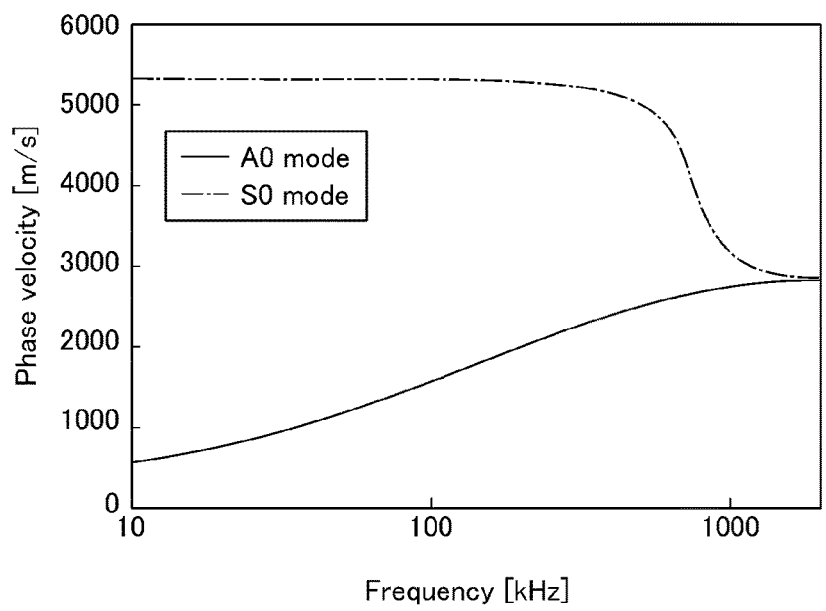
FIG. 2 is a graph for describing the results of calculating a phase velocity with respect to a frequency for an A0 mode and an S0 mode of Lamb waves.

A propagation state of Lamb waves can be obtained by introducing boundary conditions in the wave expression. A propagation velocity of Lamb waves changes in accordance with a frequency. That is to say, Lamb waves have velocity dispersion characteristics. A propagation mode of Lamb waves in a plate made of aluminum which is a thin plate includes a symmetric mode (a symmetry (S) mode) and an asymmetric mode (an anti-symmetry (A) mode). The higher the order of each propagation mode, the higher the frequency. FIG. 2 illustrates the calculation results of a change in phase velocity with respect to a change in frequency for each of the lowest 0th S mode and A mode (hereinafter may be referred to as an "S0 mode" and an "A0 mode" in some cases) in a plate made of aluminum having a thickness of 3 [mm].

Although a velocity in the S mode is faster than that in the A mode, an amplitude in the S mode is smaller than that in the A mode. In the calculation results shown in FIG. 2, a propagation velocity $v_{Lamb\_A}0$ in the A0 mode at a frequency 100 [kHz] in a plate made of aluminum is 1530 [m/s]. If the velocity $v_{air}$ of the sound waves 101 in the air is assumed to be 340.29 [m/s], the angle Ψ at this time is calculated as shown in the following Expression (2) on the basis of Expression (1).

$$\psi = \arcsin\left(\frac{v_{air}}{v_{Lamb\_A0}}\right) \cong 12.85[deg.] \quad (2)$$

As described above, when the elastic waves propagate in the structural object 11, the sound waves 101 are generated in the air adjacent to the surface 11a of the structural object 11, that is, a medium around the structural object 11. The angle Ψ formed by the wavefront 103 of the sound waves 101 and the surface 11a of the structural object 11 is determined by means of a ratio of the propagation velocity of the elastic waves in the solid material (may be referred to simply as a "velocity" in the specification in some cases) to the propagation velocity of the elastic waves in the air.

First Embodiment

Figure 3:
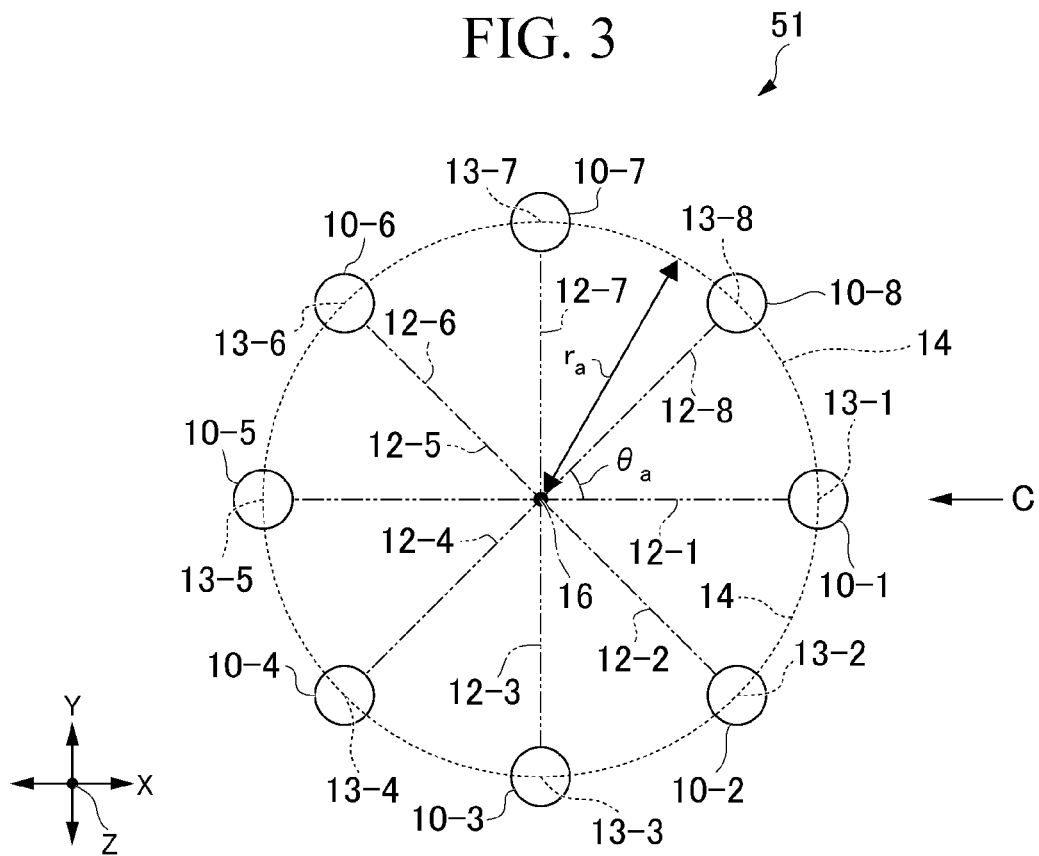
FIG. 3 is a plan view illustrating an example of a constitution of a sensor array of the measuring device in the first embodiment.

In a measuring method and a measuring device 201 in a first embodiment, on the basis of the principle described above, the sound waves 101 radiated from the surface 11a of the structural object 11 into the air are detected and a position of an occurrence source of the elastic waves in the structural object 11 is estimated. The position of the occurrence source is not specifically identified in the Z direction and means a position in an XY plane including the X direction and the Y direction. The measuring device 201 includes a sensor array (sensor part) 51 illustrated in FIGS. 3 and 4 and a position estimation device (a position estimation mechanism) 60 which will be described later. The sensor array 51 includes a plurality of ultrasonic sensors (sensors) 10-1, 10-2, . . . , and 10-j. j represents the total number of ultrasonic sensors and is any natural number of 2 or more. In FIG. 3, j=8 is satisfied. When the details common to the plurality of ultrasonic sensors 10-1, 10-2, . . . , and 10-j are described below, these ultrasonic sensors will be referred to as an "ultrasonic sensor 10."

Figure 4:
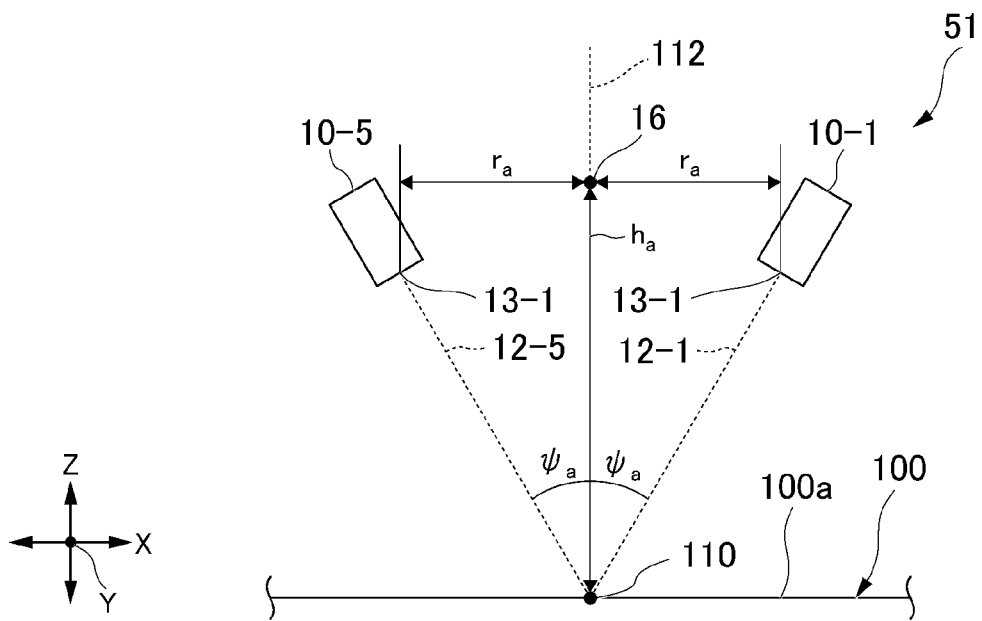
FIG. 4 is a side view of the sensor array at a position C illustrated in FIG. 3 when viewed in a Z direction.

The ultrasonic sensor 10 detects the sound waves 101 in a non-contact manner. As described above, the sound waves 101 are generated when elastic waves generated in the structural object 11 formed of a solid material are radiated into the air. The solid material is, for example, a composite material such as carbon fiber reinforced plastic in addition to concrete, iron, aluminum, ceramics, and the like, but is not limited to a specific solid material. The plurality of ultrasonic sensors 10 are disposed in the air at a prescribed height $h_a$ in the Z direction from the surface 11a of the structural object 11, and as illustrated in FIG. 4, are provided not to come into contact with the structural object 11. As illustrated in FIG. 3, the plurality of ultrasonic sensors 10 are disposed on a circle 14 having a reference position 16 as a center and a distance $r_a$ as a radius at substantially equal intervals in a circumferential direction when viewed in a plan view. That is to say, the plurality of ultrasonic sensors 10 are disposed about the reference position 16 in an annular shape. The reference position 16 is a position on the surface 11a of the structural object 11 in the air moving at the height $h_a$ in the Z direction from a reference position (a prescribed reference position) 110.

As illustrated in FIG. 4, the plurality of ultrasonic sensors 10 are disposed at an angle (a prescribed inclination angle) Ta with respect to a normal 112 of the surface 11a passing through the reference position 110. The ultrasonic sensor 10 is a detection device having directivity for elastic waves in a detection direction. Axes 12-m indicating a maximum sensitivity of the directivity of an ultrasonic sensor 10-m intersect each other at the reference position 110 and focus at one point at the reference position 110. m represents a natural number from 1 to j.

An angle $\Psi_a$ formed by the axes 12-m of the ultrasonic sensor 10-m and the normal 112 is expressed by the following Expression (3) on the basis of the velocity $v_{ae}$ of the elastic waves in the solid material of the structural object 11 to be measured and the velocity $v_{air}$ of the sound waves 101 in the air.

$$\psi_a = \arcsin\left(\frac{v_{air}}{v_{ae}}\right) \quad (3)$$

The plurality of ultrasonic sensors 10 are disposed at a certain distance (a prescribed distance) $r_a$ from the reference position 110 when viewed in a plan view. That is to say, a separation distance between a detection port 13-m of the ultrasonic sensor 10-m and the reference position 16 in the XY plane is the distance $r_a$.

Figure 5:
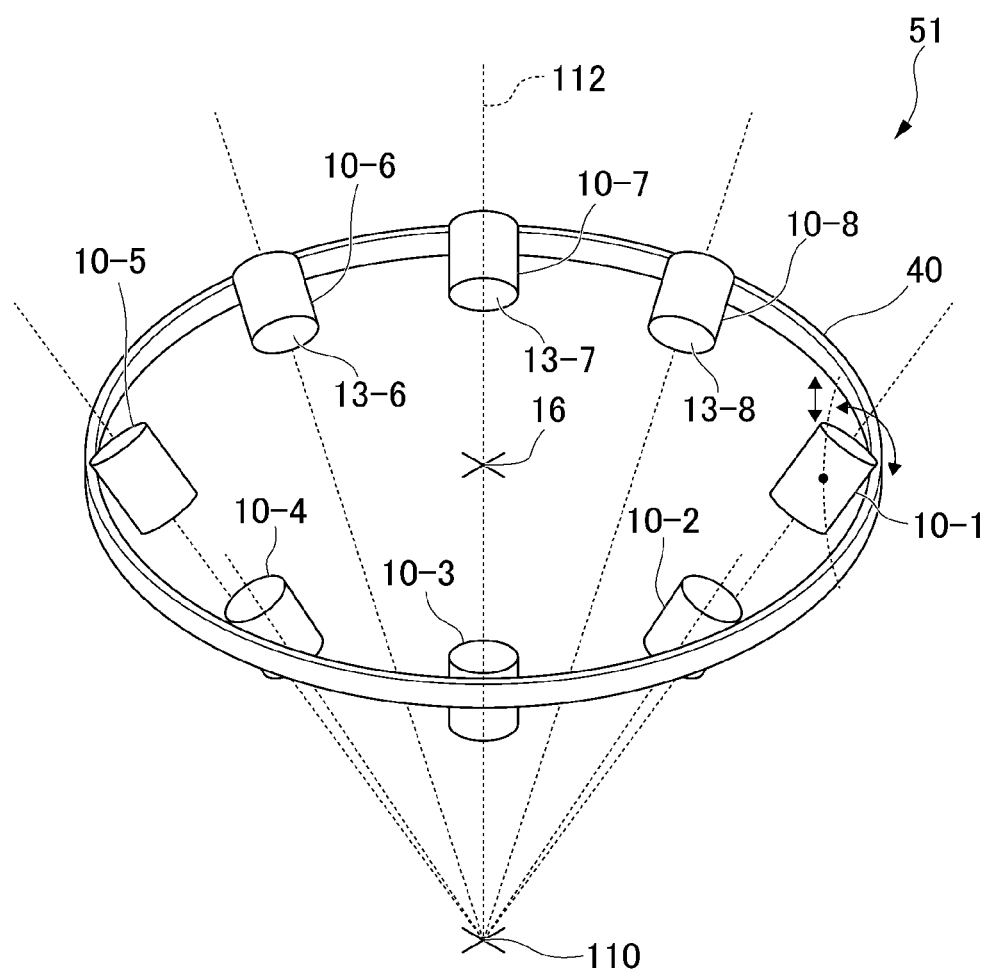
FIG. 5 is a side view illustrating a part of a constitution of the measuring device in the first embodiment.

As illustrated in FIG. 5, the sensor array 51 includes a frame member 40 configured to support the plurality of ultrasonic sensors 10 in an annular shape when viewed in a plan view as described above and in a discrete manner, in addition to the plurality of ultrasonic sensors 10. In the drawings other than FIG. 5, the frame member 40 is omitted.

The frame member 40 is formed to have the reference position 16 as a center in an annular shape. For example, the eight ultrasonic sensors 10-1, . . . , and 10-8 are installed on an inner circumferential side of the frame member 40 by means of connecting members or the like (not shown). The ultrasonic sensors 10-*m* are disposed so that the axes 12-*m* gather and intersect at the reference position 110 below the sensor array 51. The detection port 13-*m* of the ultrasonic sensor 10-*m* is disposed to hang below the frame member 40 and faces the reference position 110 when viewed in a plan view.

The sensor array 51 may include a member suitable for installing the plurality of ultrasonic sensors 10 as described above, in addition to the frame member 40. Although FIG. 5 illustrates only the ultrasonic sensor 10-1, the connecting members (not shown) between the ultrasonic sensor 10 and the frame member 40 may be configured so that a position of the ultrasonic sensor 10-*m* in the Z direction and an angle Ta formed by the axes 12-*m* with respect to the normal 112 can be changed. In the sensor array 51, the frame member 40 may be movably installed or fixed in a space in the surface 11*a* of the structural object 11 to be measured on the air side and may be configured to be able to fly by being connected to an air vehicle or the like.

Before the detailed constitution of the position estimation device 60 is explained, the principle of estimating information concerning a position of an occurrence source 120 from information concerning the sound waves 101 detected by the plurality of ultrasonic sensors 10 in the measuring method and the measuring device 201 in the first embodiment will be described. The detection port 13-*m* configured to detect ultrasonic waves in the ultrasonic sensor 10-*m* is directed to the reference position 110.

Figure 6A:
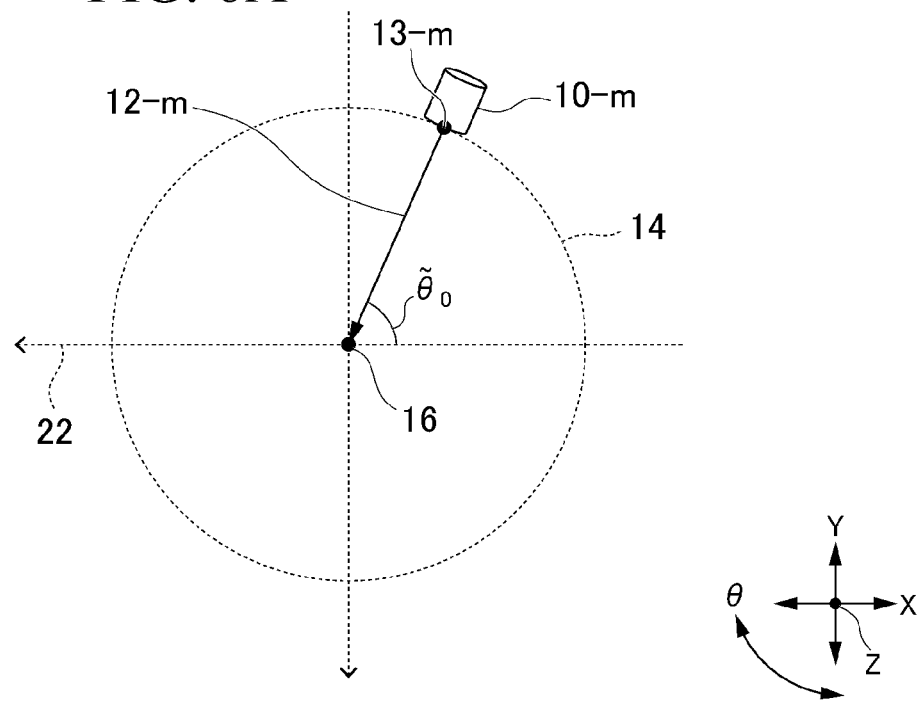
FIG. 6A is a plan view for explaining a direction and an angle when a structural object is viewed from one sensor included in the sensor array.
Figure 6B:
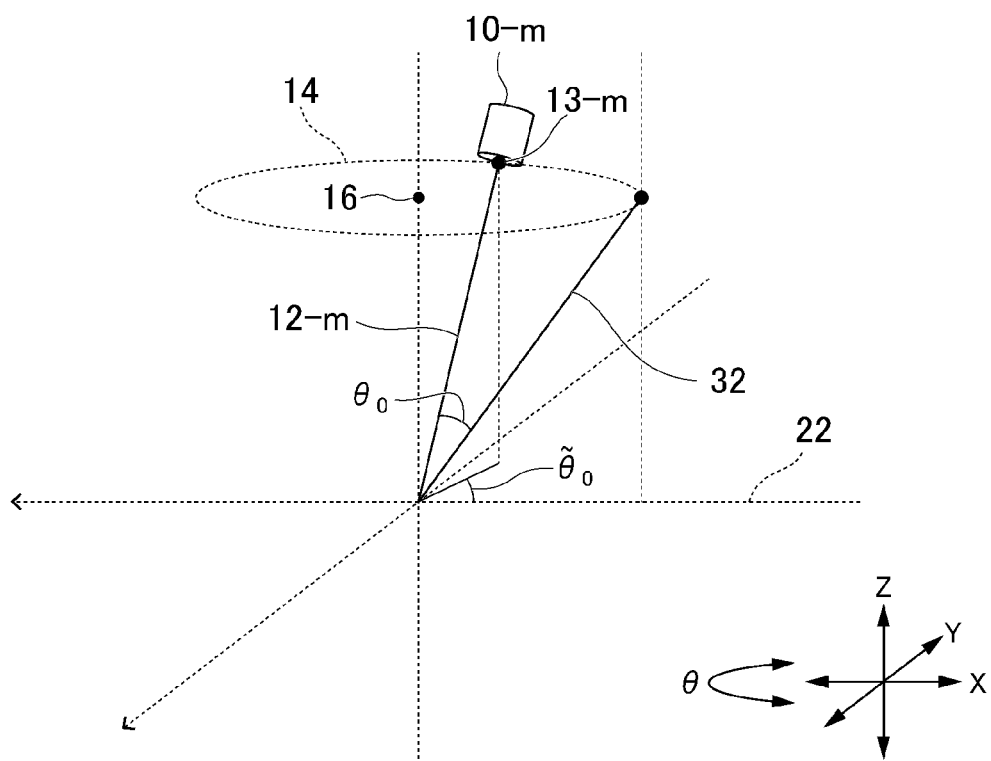
FIG. 6B is a perspective view for explaining a direction and an angle when a structural object is viewed from one sensor included in the sensor array.

The directivity of the ultrasonic sensor 10 is regarded as a problem of a sound field formed in a range on a disk having a prescribed radius embedded in an infinite rigid wall and vibrating at a prescribed angular frequency. Assuming that a sound field is formed in a long-distance field, when an azimuth angle of the axes 12-*m* of the ultrasonic sensor 10-*m* illustrated in FIGS. 6A and 6B when viewed in a plan view is approximately $\theta_0$, a directivity function which is a function of an angle $\theta$ indicating a directivity in the XY plane is expressed by the left side expressed by the following Expression (4) and is approximated so that the directivity function has the right side expressed by Expression (4) using the angle $\theta_0$ formed by a reference axis 32 and the axes 12-*m* and a wave number k of elastic waves. $J_1$ in Expression (4) is a first-order Bessel function.

$$D(\theta) = \frac{2J_1\{ka\sin(\theta - \theta_0)\}}{ka\sin(\theta - \theta_0)} \quad (4)$$

If an azimuth angle $\theta_{azm}$ when the elastic waves arrive at each ultrasonic sensor 10 included in the sensor array 51 is considered, an angle $\theta$ deviated in a detection direction in which the directivity of the ultrasonic sensor 10 is the highest and in an arrival direction of the reference positions 16 and 110 of the elastic waves is expressed as the following Expression (5) and the foregoing Expression (1) through geometric calculation using the velocity $v_{ae}$ of the elastic waves in the structural object 11.

$$\theta = \arccos\{1 - (\sin\psi)^2(1 - \cos\theta_{azm})\} \quad (5)$$

Figure 6C:
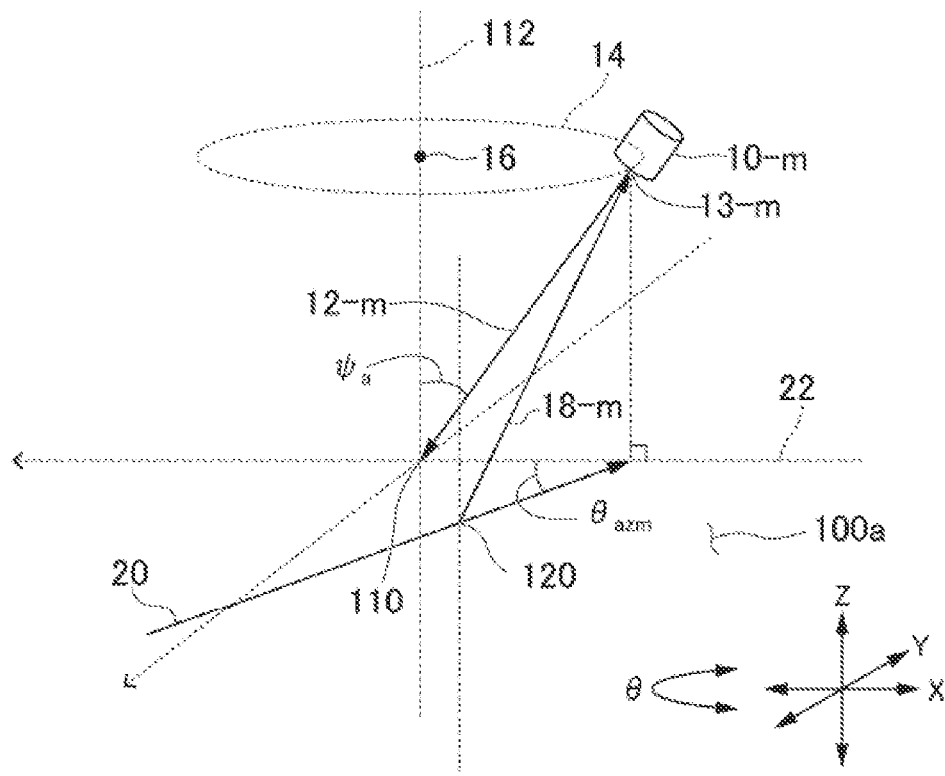
FIG. 6C is a perspective view for explaining a direction and an angle when a structural object is viewed from one sensor included in the sensor array.
Figure 7:
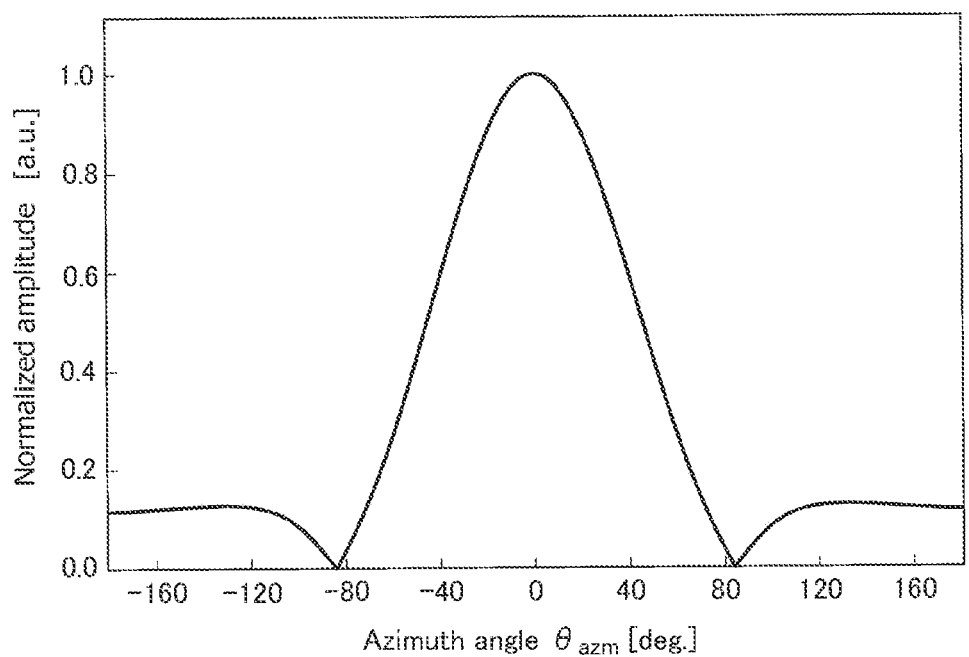
FIG. 7 is a graph illustrating an example of a plot showing a change in normalized amplitude with respect to a deviation in azimuth angle.

As an example, on the assumption that a frequency of the elastic waves in the structural object 11 is 200 [kHz], a velocity of the elastic waves is 1530 [m/s], a sound velocity in the air is 340.29 [m/s], and a vibrator radius of the ultrasonic sensor 10 is 3.5 [mm], FIG. 7 shows the result of calculating numerical values of amplitude characteristics of the sound waves 101 with an angle representing an amount of deviation in an azimuth angle (an azimuth angle illustrated in FIG. 7). As illustrated in FIG. 7, in each of the plurality of ultrasonic sensors 10 in the XY plane, a change in intensity of an AE signal (a signal) to be detected is shown on the basis of an angle difference between a direction in which the sound waves 101 arrive (a direction in which an axis is directed) and a direction in which the elastic waves arrive from an occurrence source toward the reference position 16 (a detection direction of the elastic waves). The above-described angle difference is associated with the azimuth angle $\theta_{azm}$ of the axes 12-*m* of the ultrasonic sensor 10-*m* and is represented by the angle $\theta_{src}$ illustrated in FIG. 6C. In FIG. 6C, $\theta_0 = 0$ is satisfied.

As can be seen from the above description, when detection directions used for detecting the elastic waves by means of the axes 12-*m* are known in advance and the sound waves 101 are simultaneously detected by the plurality of ultrasonic sensors 10 directed in different directions, at least a two-dimensional position (position) of an occurrence source in which an AE signal is produced is estimated.

Figure 8:
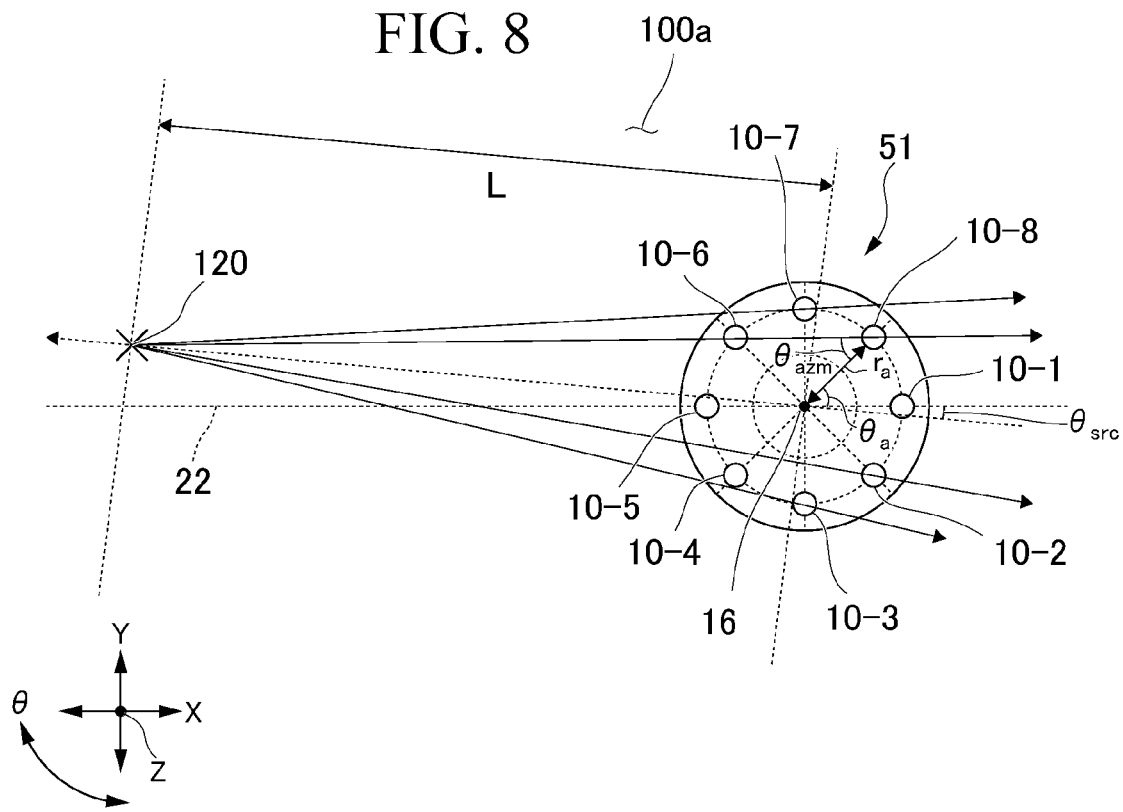
FIG. 8 is a plan view for explaining a positional relationship between the sensor array and an occurrence source of elastic waves.

As illustrated in FIG. 8, regarding a position of the sensor array 51, when a distance L between the reference position 16 and the occurrence source 120 of the elastic waves is, for example, several times a size of the sensor array 51, that is, a diameter thereof, when viewed in a plan view and is regarded to be finite, the elastic waves arriving from the occurrence source 120 at the sensor array 51 are incident on the plurality of ultrasonic sensors 10 disposed in an annular shape about the reference position 16 when viewed in a plan view at different azimuth angles $\theta_{azm}$.

Figure 9:
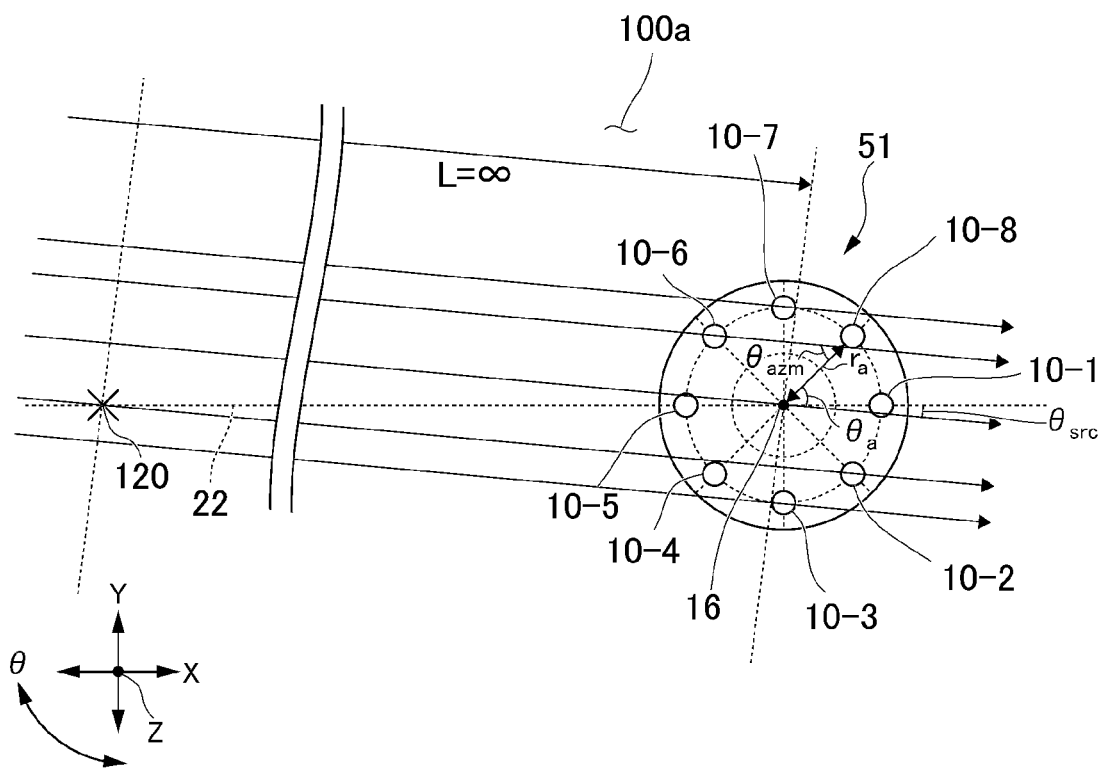
FIG. 9 is a plan view for explaining a positional relationship between the sensor array and an occurrence source of elastic waves.

On the other hand, as illustrated in FIG. 9, when the distance L is much larger than the diameter of the sensor array 51 when viewed in a plan view and is regarded to be infinite, the elastic waves arriving from the occurrence source 120 at the sensor array 51 are incident on the plurality of ultrasonic sensors 10 at substantially the same azimuth angle $\theta$. That is to say, the angle $\theta_{src}$ indicates a detection in which the elastic waves (hereinafter may be referred to as "AE waves" in some cases) arrive at the sensor array 51, that is, a detection direction of the AE waves. The angle $\theta_{src}$ represents an angle formed by a direction in which an AE signal (or AE waves) is detected with respect to an axis 22 using the axis 22 parallel to the X direction and passing through the reference position 16 when viewed in a plan view as a reference line.

As illustrated in FIGS. 8 and 9, when the axis 22 is set as a reference direction of the sensor array 51, if the angle $\theta_{src}$, the angle $\theta_a$, the distance $r_a$ connecting the detection port 13-*m* of the ultrasonic sensor 10-*m* and the reference position 16, and the distance L are used, the azimuth angle $\theta_{azm}$ at which the elastic waves are incident on the ultrasonic sensor is represented by the following Expressions (6) and (7). Here, the angle $\theta_{src}$ indicates a direction from a detection position of the elastic waves when viewed in a plan view, that is, the reference position 16 toward the occurrence source. The angle $\theta_a$ is determined using a relative disposition of the ultrasonic sensors 10 and represents an angle formed by the axis 12-*m* of each of the ultrasonic sensors 10-*m* and the axis 22 when viewed in a plan view.

$$\theta_{azm} = \hat{\theta}_{src} - \arctan\left\{\frac{r \cdot \sin \hat{\theta}_{src}}{L + r \cdot \cos \hat{\theta}_{src}}\right\} \quad (6)$$

In Expression (6), when the distance L is regarded to be infinite, the second term on the right side can be approximated to 0.

$$\hat{\theta}_{src} = \theta_a + \theta_{src} \quad (7)$$

The hat written above the angle $\theta_{src}$ in Expressions (6) and (7) indicates that the angle $\theta_{src}$ is an estimator. When the plurality of ultrasonic sensors 10 are disposed as illustrated in FIGS. 3 and 4, in the foregoing Expression (5), $\Psi = \Psi_a$ is satisfied, and in Expression (6), $r = r_a$ is satisfied.

Figure 10:
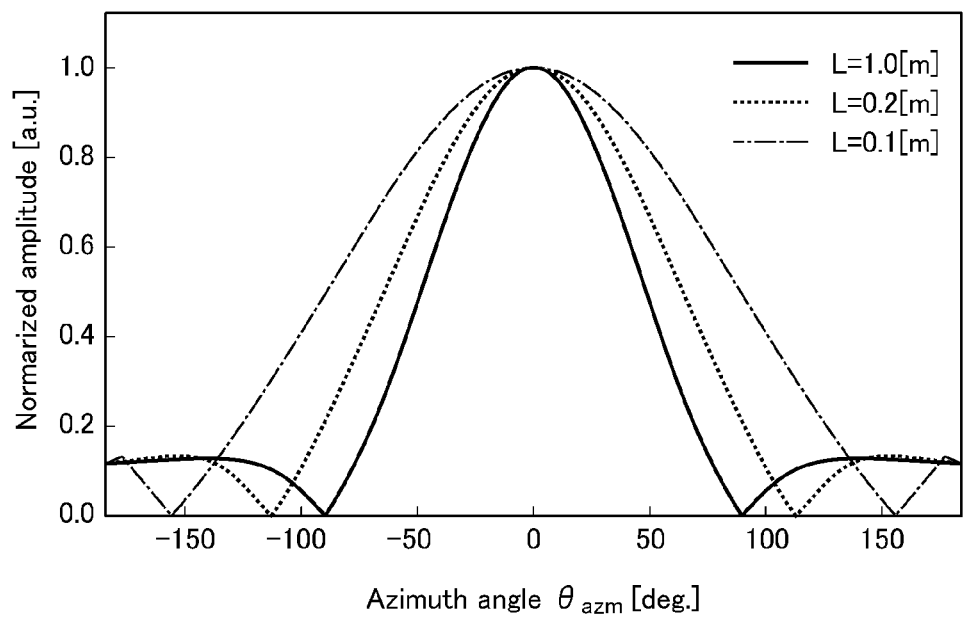
FIG. 10 is a graph for describing the results of calculating a normalized amplitude with respect to a deviation in azimuth angle.

FIG. 10 is a graph obtained by numerically calculating a change in normalized amplitude value (information concerning an intensity) with respect to the azimuth angle $\theta_{azm}$ as information regarding an intensity of the AE signal on the basis of Expressions (5) and (6) using the same parameters as in the above example and plotting the calculation results. If the distance L is increased to 0.1 [m], 0.2 [m], and 1.0 [m], an azimuth angle $\theta_{azm}$ of a peak does not change substantially and a half-value angle decreases. An angle $\theta_{azm}$ of the peak indicates a direction in which there is the occurrence source 120 when viewed from the reference position 16 of the sensor array 51. A half-value angle of a plot of the normalized amplitude value with respect to the angle $\theta_{azm}$ depends on the distance L and increases when the distance $r_a$ decreases.

Figure 11:
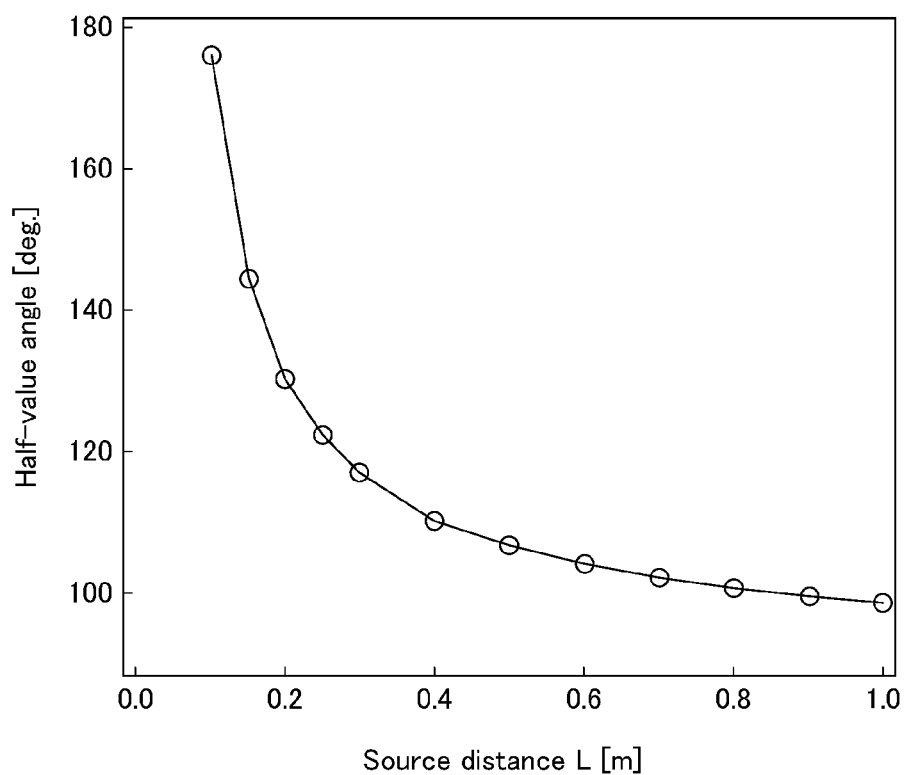
FIG. 11 is a graph for describing the results of obtaining a correlation relation between a distance between a reference position of the sensor array and an occurrence source and a half value.

FIG. 11 shows a relationship between the distance L and the half-value angle when the following values are substituted into Expressions (5) to (7) on the assumption that the distance $r_a$ is 95 [mm], a frequency of the elastic waves is 200 [kHz], a velocity of the elastic waves is 1530 [m/s], a sound velocity in the air is 340.29 [m/s], and a radius of a vibrator is 3.5 [mm]. At the time of actual measurement, based on conditions such as a propagation velocity of the elastic waves depending on the solid material of the structural object 11, as illustrated in FIG. 11, a half-value width when the distance L is changed is calculated in advance and a calibration curve between the distance L and the half-value width is created. Subsequently, based on the total number or disposition of the plurality of ultrasonic sensors 10 in the sensor array 51, an amplitude value for each of the discrete azimuth angles $\theta_{azm}$ is obtained. When the obtained amplitude value is fitted by means of Expressions (6) and (7), a peak angle and a half-value angle are calculated, a direction inclined with respect to the axis 22 is obtained using the peak angle as the angle $\theta_{src}$, and the distance L is obtained by making the half-value width fit to the above-described calibration curve. It is possible to estimate a position in which there is the occurrence source 120 when viewed from the sensor array 51 using this calculated information.

When the amplitude value obtained at each of the discrete angles $\theta_{azm}$ is fitted on the basis of the mathematical expression as described above, the directivity function represented by Expression (4) can be used as a fitting function. As a fitting function which is simpler than the directivity function, the von Mises distribution function represented by the following Expression (8) can be used.

$$f(\theta) = A \cdot e^{\kappa \cdot \cos(\theta - \theta_0)} \quad (8)$$

In Expression (7), A represents a scaling factor associated with an amplitude and κ represents a distribution concentration parameter associated with a distance. The fitting function is not particularly limited as long as the fitting function has an element which leads to a relationship between the distance L and the half-value angle.

In the sensor array 51 used in the above-described measuring method, as illustrated in FIG. 3, the plurality of ultrasonic sensors 10 are disposed at equal intervals in the circumferential direction on a virtual circle 14 having a radius centered on the reference position 16 and having a distance $r_a$. If a circular coordinate (r-O coordinate) system in which the reference position 16 is a point of r=0 is assumed, coordinates $P_m$ of the m ultrasonic sensor 10-*m* (Sm; m=1, . . . and j) are represented by the following Expressions (9) and (10).

$$P_m:(r_a, n\theta_a)(m=1, \ldots, j) \quad (9)$$

$$\theta_a = 2\pi/j \quad (10)$$

As will be described later on the basis of the above principle, when the angle $\theta_{src}$ and the distance L are calculated using the fitting function (a continuous function), it is possible to calculate an exact position of the occurrence source 120 by applying this information to the circle coordinate system.

Figure 12:
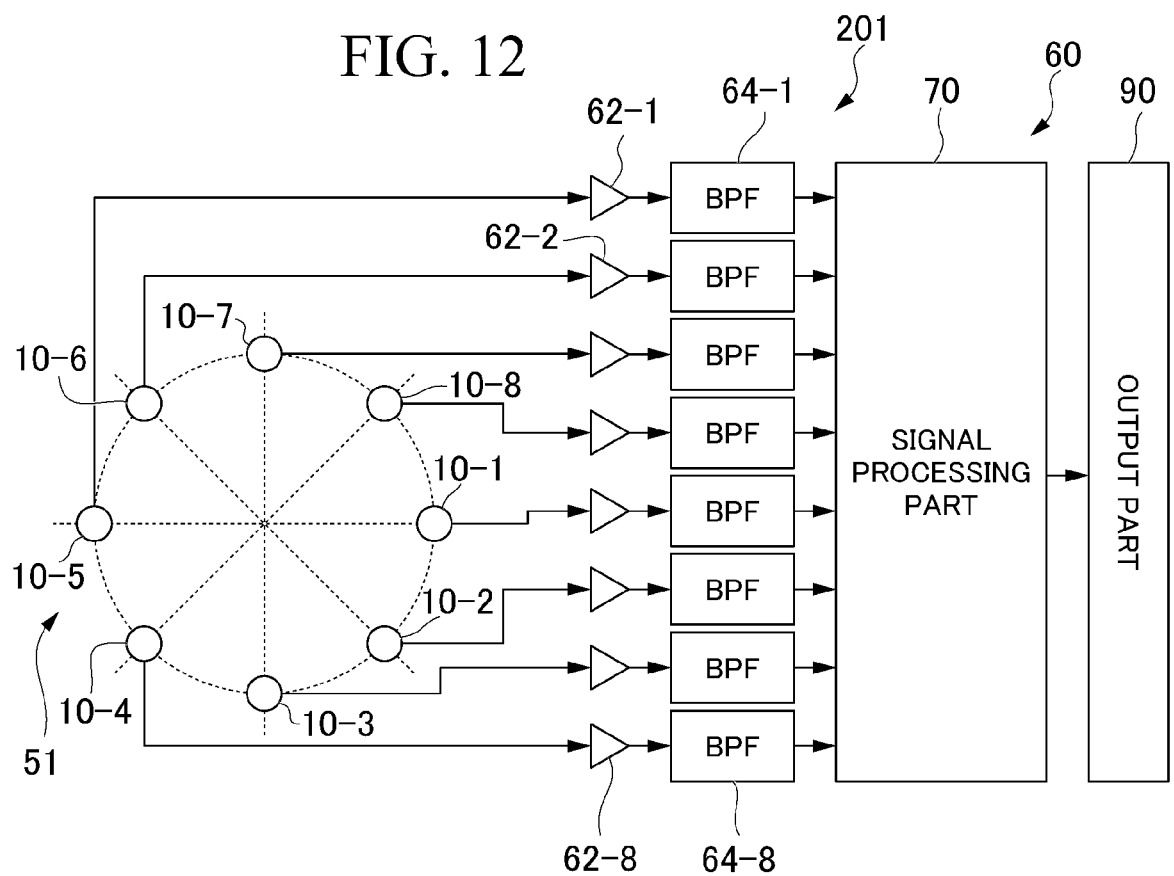
FIG. 12 is a block diagram of the measuring device in the first embodiment.

As illustrated in FIG. 12, the measuring device 201 in the first embodiment includes the sensor array 51 and the position estimation device 60. The position estimation device 60 includes amplifiers 62-1 to 62-*j* having the same total number j as the plurality of ultrasonic sensors 10, bandpass filters (BPS) 64-1 to 64-*j*, a signal processing part 70, and an output part 90. The amplifiers 62-1 to 62-*j* amplify a voltage signal (information regarding an intensity of a signal of the elastic waves) associated with the sound waves 101 output from the ultrasonic sensors 10-1 to 10-*j* with, for example, a prescribed gain such as a voltage gain. The BPFs 64-1 to 64-*j* remove noise components outside of a prescribed band of the voltage signals amplified by the amplifiers 62-1 to 62-*j* and output a voltage signal within a prescribed band. Types of BPFs 64-1 to 64-*j* are not particularly limited as long as the BPFs 64-1 to 64-*j* are filters capable of performing the above-described operations. The signal processing part 70 detects an amplitude associated with the sound waves 101 detected by the plurality of ultrasonic sensors 10 and estimates a position of the occurrence source 120 through a prescribed arithmetic process. The output part 90 includes a display device or the like which outputs the estimated position of the occurrence source 120 to the outside, and for example, displays the estimated position of the occurrence source 120 directly or remotely.

Figure 13:
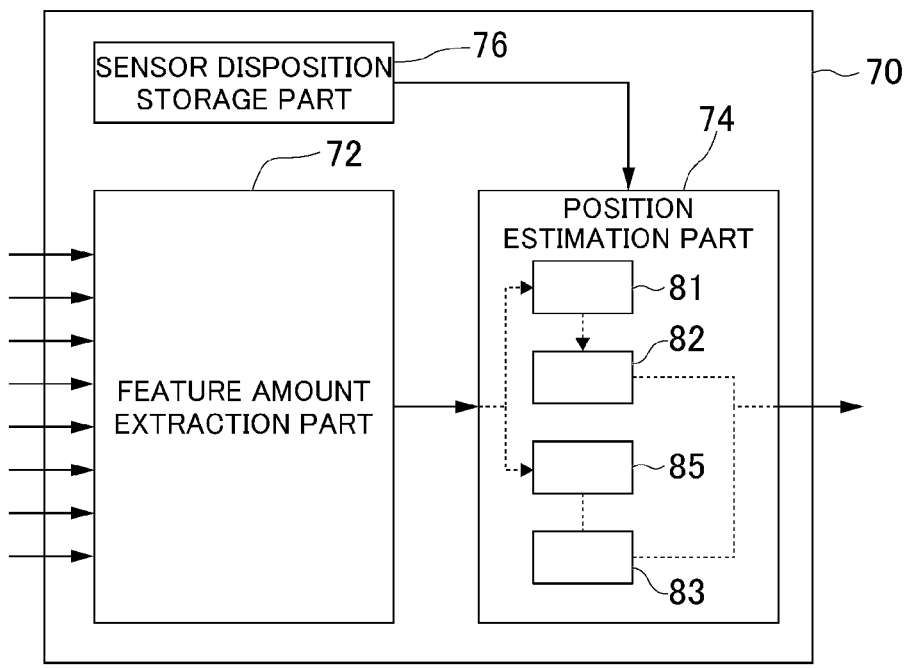
FIG. 13 is a block diagram of a signal processing part illustrated in FIG. 12.
Figure 14:
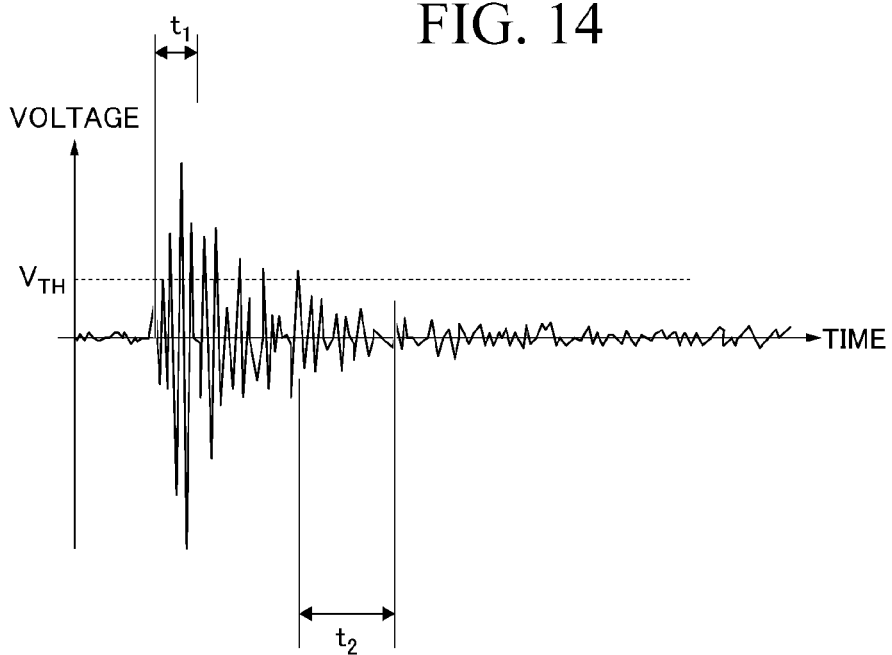
FIG. 14 is a schematic diagram for explaining a process in a feature amount extraction part illustrated in FIG. 13.
Figure 15:
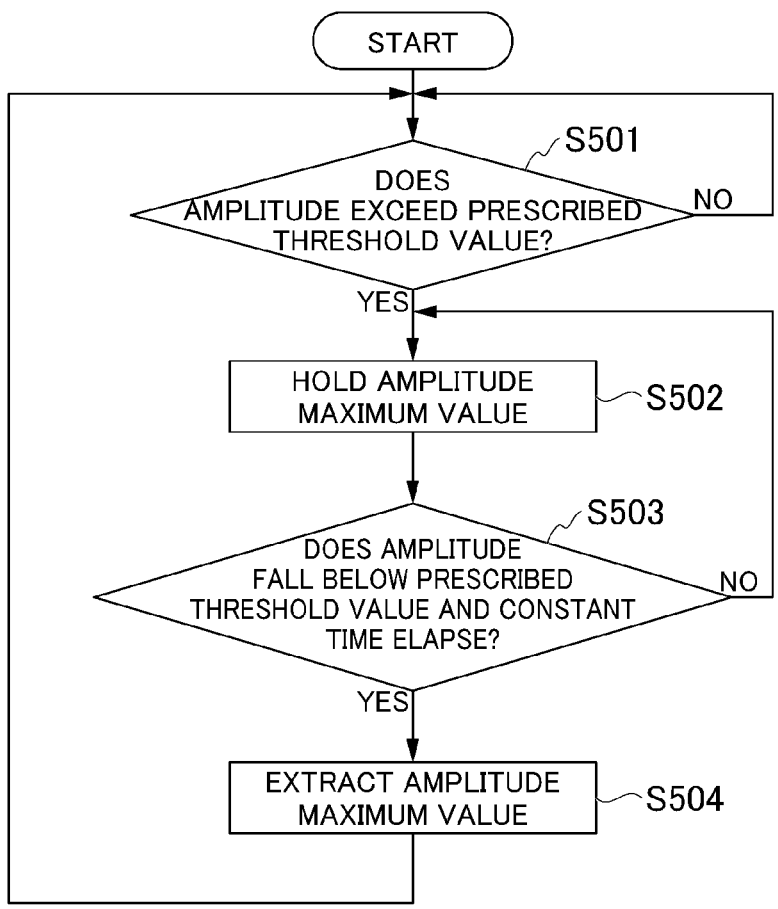
FIG. 15 is a flowchart of a process performed by means of the feature amount extraction part illustrated in FIG. 13.

As illustrated in FIG. 13, the signal processing part 70 includes a feature amount extraction part 72, a position estimation part 74, and a sensor disposition storage part 76. The feature amount extraction part 72 extracts information regarding an amplitude of the sound waves 101 at least as information regarding an amplitude of the elastic waves. FIG. 14 shows a typical example of a time change of a voltage signal associated with the amplitude of the sound waves 101. As illustrated in FIG. 14, the amplitude of the voltage signal increases immediately after the start of detection and is larger in an initial time zone t1 than in the subsequent time. The amplitude of the voltage signal after a maximum peak decreases with the passage of time and remains weak. Based on such characteristics of the time change in the amplitude of the voltage signal, the feature amount extraction part 72 performs the processing of the flowchart shown in FIG. 15. If the measurement is started, the feature amount extraction part 72 determines whether the voltage signal exceeds a prescribed amplitude threshold value $V_{TH}$ (Step S501). When it is determined that the voltage signal exceeds the prescribed threshold value, a maximum value of the amplitude is maintained in the subsequent time. The above-described maximum value of the amplitude is maintained until the amplitude continues to fall below the prescribed threshold value for a certain time $t_2$ (Step S502). When it is determined that the amplitude falls below the threshold value $V_{TH}$ for a certain time $t_2$, it is determined that a series of elastic waves has converged (Step S503), the maximum value of the amplitude at that time is extracted (Step S504) and the extracted maximum value is transmitted to the position estimation part 74.

Figure 16:
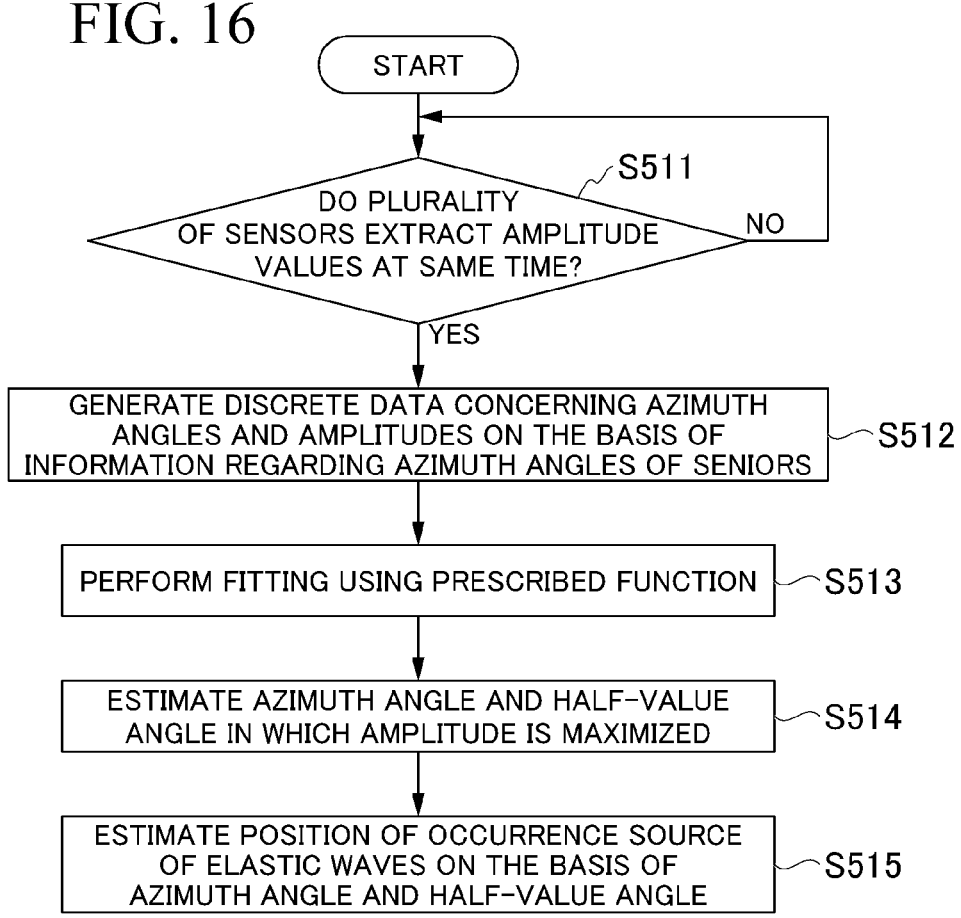
FIG. 16 is a flowchart of a process performed by means of a position estimation part illustrated in FIG. 13.

The position estimation part 74 performs the processing of the flowchart shown in FIG. 16. The sensor disposition storage part 76 stores data such as the total number j, the distance $r_a$, and the angle $\Psi_a$ as information regarding the disposition of the ultrasonic sensor 10. The position estimation part 74 determines whether the amplitude values have been extracted using the plurality of ultrasonic sensors 10 at the same time (Step S511). When it is determined that the amplitude values are extracted using the plurality of ultrasonic sensors 10 at the same time, data concerning the plurality of discrete angles $\theta_{azm}$ and amplitude values at the angles $\theta_{azm}$ is created on the basis of the information regarding the azimuth angle $\theta_{azm}$ of the ultrasonic sensor 10 (Step S512). Fitting is performed on the created discrete data through a prescribed continuous function (Step S513) and a peak angle and a half-value angle are obtained (Step S514). The peak angle corresponds to a direction in which there is the occurrence source 120 when viewed from the sensor array 51 and the half-value angle corresponds to the distance L. Based on these facts, a relationship between the half-value angle and the distance L may be calculated each time on the basis of the foregoing Expressions (5) and (6) or a data table may be created in advance. Based on the obtained angle $\theta_{azm}$, two-dimensional plane coordinates of the occurrence source 120 may be calculated on the basis of the direction in which there is the occurrence source 120 when viewed from the sensor array 51, that is, the detection direction of the elastic waves and the distance L.

The feature amount extraction part 72, the position estimation part 74, the sensor disposition storage part 76, and the output part 90 may be functional parts which function using software or may be functional parts which function using hardware such as an LSI or FPGA.

As described above, the measuring method in the first embodiment includes estimating a position of the occurrence source 120 of the elastic waves in the structural object 11 formed of a solid material by detecting the sound waves 101 using the sensor array 51 having the plurality of ultrasonic sensors 10. The measuring method in the first embodiment includes detecting the sound waves 101 generated when the elastic waves generated in the structural object 11 are radiated from the surface 11a into the air from the structural object 11 to be measured in a non-contact manner and estimating a position of the occurrence source 120 of the elastic waves on the basis of the information regarding the intensity of the signal of the detected sound waves 101. According to the measuring method in the first embodiment, elastic waves such as Lamb waves generated in the structural object 11 are detected by the ultrasonic sensor 10 having directivity as ultrasonic waves such as the sound waves 101 radiated from the surface 11a into the air. In order to detect the sound waves 101 using only the ultrasonic sensor 10 which is not in contact with the structural object 11, it is not necessary to dispose the measuring device including an AE sensor to be in contact with the structural object 11 as in the position evaluation analysis based on the AE method in the related art. For this reason, the present invention can be applied to the estimation of an occurrence source of the elastic waves in a structural object in which it is difficult to install an AE sensor on the surface of the structural object. Even if a region including the occurrence source 120 is unknown in advance, it is possible to detect a signal from the occurrence source 120. The present invention can be performed even in an environment in which it is difficult to install an AE sensor on a structure object. As a result, it is possible to increase degrees of freedom of the structural object 11 to be measured and freedom in a measurement range or a measurement environment associated with the position of the occurrence source.

Figure 17:
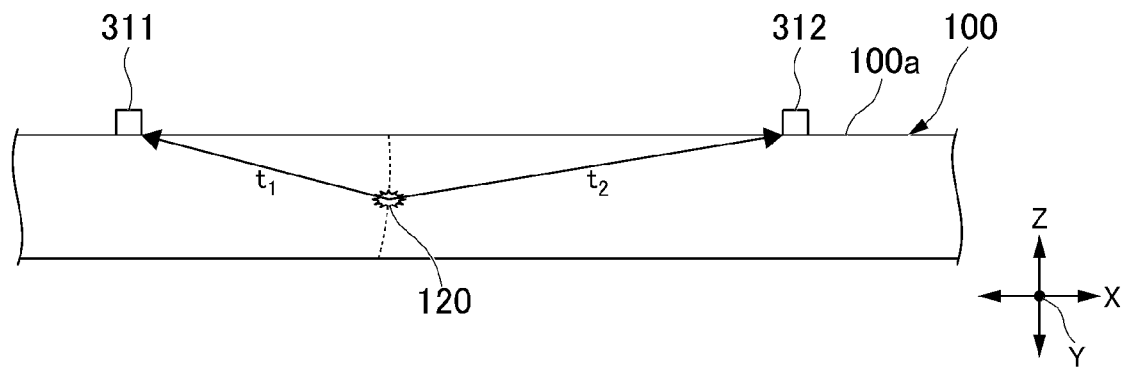
FIG. 17 is a side view for explaining a positioning method in the related art associated with an occurrence source of elastic waves in a structural object.

As illustrated in FIG. 17, in the positioning method based on the AE method in the related art, two AE sensors 311 and 312 are disposed on a surface 100a of a structural object 100 at intervals from each other. In the positioning method in the related art in which the AE sensors 311 and 312 are used, it is possible to determine a position of the occurrence source 120 on the basis of information concerning a difference between arrival times t1 and t2 at which the elastic waves arrive at the AE sensors 311 and 312. However, it is necessary to dispose the AE sensors on the structural object 100 in which elastic waves such as Rayleigh waves and Lamb waves are generated. Furthermore, it is necessary to install a plurality of AE sensors 311 and 312 to surround the occurrence source 120 when viewed in a plan view.

According to the measuring method in the first embodiment, the accuracy of the position of the occurrence source 120 estimated as in the related art does not decrease depending on the accuracy of determining an arrival time and it is not necessary to dispose a large number of sensors in a wide range in advance to estimate a position in a wide range. In the measuring method in the first embodiment, there is no factor which decreases the estimation accuracy of the position of the occurrence source 120 and it is possible to easily estimate a two-dimensional position of the occurrence source 120.

The measuring method in the first embodiment includes estimating, when the position of the occurrence source 120 is estimated, at least one of the direction from the reference position 16 (the detection position of the elastic waves) of the sensor array 51 toward the occurrence source 120 and the distance from the reference position 16 to the occurrence source 120 on the basis of the information regarding the detection direction of the elastic waves and the information regarding the intensity of the elastic waves is estimated. According to the measuring method in the first embodiment, it is possible to estimate the position of the occurrence source 120 on the basis of the correspondence relationship between the arrival direction of the elastic waves and the intensity using the plurality of ultrasonic sensors 10.

The measuring method in the first embodiment includes detecting, when the position of the occurrence source 120 is estimated, the plurality of azimuth angles $\theta_{azm}$ used for detecting the sound waves 101, that is, the detection angles in a discrete manner and obtaining information of an actual measurement function (not shown) which represents the change in the amplitude of the sound waves with respect to the detection angles by fitting the continuous function to the plot of the amplitude as information concerning the intensity of the sound waves 101 at the detection angles for the plurality of detection angles. Based on the information of the actual measurement function, at least one of the direction from the reference position 16 of the elastic waves toward the occurrence source 120 and the distance L from the reference position 16 to the occurrence source 120 is estimated. According to the measuring method in the first embodiment, specifically, since the relationship between the angle $\theta_{azm}$ and the amplitude of the sound waves 101 is fitted through a theoretical continuous function, it is possible to obtain information regarding the relationship between the angle $\theta_{azm}$ and the amplitude of the sound waves 101 which is not included in the discrete data.

The measuring method in the first embodiment includes detecting elastic waves in a non-contact manner using the plurality of ultrasonic sensors 10 as AE sensors and using a directivity function based on a resonance frequency and a vibrator radius of the ultrasonic sensor 10 as a continuous function. According to the measuring method in the first embodiment, it is possible to estimate a position of the occurrence source 120 when viewed in a plan view using the continuous function optimal for the ultrasonic sensor 10 by introducing parameters associated with the ultrasonic sensor 10. The von Mises distribution function may be used as a continuous function. When the von Mises distribution function is used, a calculation process of calculating an actual measurement function by mainly fitting the continuous function to discrete data is simplified and an amount of calculation can be reduced.

The measuring device 201 in the first embodiment includes the sensor array 51 and the position estimation device 60. The sensor array 51 has the plurality of ultrasonic sensors 10 configured to detect the sound waves 101 generated in the structural object 11 formed of a solid material in a non-contact manner. The position estimation device 60 estimates a position of the occurrence source 120 on the basis of the information regarding an intensity of a signal of the sound waves 101 detected by the ultrasonic sensor 10. According to the measuring device 201 in the first embodiment, the elastic waves generated in the structural object 11 are detected by the ultrasonic sensor 10 having directivity as ultrasonic waves such as the sound waves 101. Since the sound waves 101 is detected using only the ultrasonic sensor 10 which is not in contact with the structural object 11, it may not be necessary to dispose the measuring device including the AE sensor to be in contact with the structural object 11 as in the position evaluation analysis based on the AE method in the related art. For this reason, it can also be applied to the estimation of the occurrence source of elastic waves in a structural object in which it is difficult to install an AE sensor on a surface of the structural object. As a result, it is possible to increase degrees of freedom of the structural object 11 to be measured and freedom in a measurement range or a measurement environment associated with the position of the occurrence source.

In the measuring device 201 in the first embodiment, the position estimation device 60 includes a detection direction acquisition part 81, an intensity acquisition part 82, and a position estimation part (an estimation part) 74. The detection direction acquisition part 81 acquires information regarding a detection direction of sound waves 101 in each ultrasonic sensor 10 included in the plurality of ultrasonic sensors 10. The intensity acquisition part acquires information regarding an intensity of a signal of the sound waves 101 detected by each ultrasonic sensor 10. As illustrated in FIG. 13, the position estimation part 74 described above includes the detection direction acquisition part 81 and the intensity acquisition part 82. That is to say, in the position estimation part 74, as described with reference to Step S512 of the flowchart shown in FIG. 16, based on the information regarding the azimuth angle $\theta_{azm}$ of the ultrasonic sensor 10, data concerning a plurality of discrete angles $\theta_{azm}$ and amplitude values at each angle $\theta_{azm}$ is created. In this data, a maximum peak angle $\theta_{azm}$ represents an angle $\theta_{src}$ indicating a detection direction of the sound waves 101 in each ultrasonic sensor 10. The amplitude value at the angle $\theta_{azm}$ is associated with the intensity of the signal of the sound waves 101 detected by each ultrasonic sensor 10. The position estimation part 74 estimates an angle $\theta_{src}$ and a distance L from the reference position 16 to the occurrence source 120 as a direction from the reference position 16 of the sensor array 51 toward the occurrence source 120 on the basis of the information regarding the detection direction of the sound waves 101 and the information regarding the intensity of the signal of the sound waves 101 detected by each ultrasonic sensor 10. According to the measuring device 201 in the first embodiment, it is possible to acquire the information regarding the direction of the occurrence source 120 when viewed from the sensor array 51 and the distance L between the sensor array 51 and the occurrence source 120 on the basis a correspondence relationship between the arrival direction of the sound waves 101 detected by each ultrasonic sensor 10 and the intensity and estimate the position of the occurrence source 120.

In the measuring device 201 in the first embodiment, the position estimation device 60 includes a detection angle acquisition part 85, a function acquisition part 83, and the position estimation part 74. The detection angle acquisition part 85 acquires information regarding a plurality of detection angles of the sound waves 101 obtained in a discrete manner by each ultrasonic sensor 10 included the sensor array 51. The function acquisition part 83 acquires information of an actual measurement function representing a change in amplitude with respect to an angle (a detection angle) $\theta_{azm}$ by fitting a continuous function to the plot of the amplitude (the information regarding the intensity) of the sound waves 101 with respect to the detection angle of the plurality of ultrasonic sensors 10 of the sensor array 51. The position estimation part 74 described above includes the detection angle acquisition part 85 and the function acquisition part 83. That is to say, in the detection angle acquisition part 85 of the position estimation part 74, as described with reference to Steps S513 and S514 of the flowchart shown in FIG. 16, discrete data is created on the basis of the amplitude values at the angle $\theta_{azm}$ and the angle $\theta_{azm}$ detected by the plurality of ultrasonic sensors 10. The function acquisition part 83 of the position estimation part 74 fits the created discrete data with a prescribed continuous function and uses a function which fits best as an actual measurement function. The position estimation part 74 estimates an angle $\theta_{src}$ indicating the direction from the reference position 16 of the sensor array 51 toward the occurrence source 120 and a distance L from the reference position 16 to the occurrence source 120 on the basis of the information regarding the actual measurement function acquired by the function acquisition part 83.

In the measuring device 201 in the first embodiment, the AE sensor capable of detecting ultrasonic waves is used as a sensor configured to detect sound waves 101 in a state of non-contact with the structural object 11. The continuous function described above is a directivity function expressed by Expression (3) on the basis of the resonance frequency and the vibrator radius of the ultrasonic sensor (that is, the AE sensor) 10. According to the measuring device 201 in the first embodiment, it is possible to estimate a position of the occurrence source 120 when viewed in the plan view using a continuous function optimal for the ultrasonic sensor 10. As described above, the von Mises distribution function may be used as the continuous function. In that case, the calculation process of fitting the continuous function to the discrete data to calculate the actual measurement function can be simplified and the amount of calculation can be reduced.

In the measuring device 201 in the first embodiment, the plurality of ultrasonic sensors 10 are disposed in an annular shape about the reference position 16 when viewed in a plan view, that is, when viewed from the Z direction. According to the measuring device 201 in the first embodiment, since the distance $r_a$ between the plurality of ultrasonic sensors 10 and the reference position 16 is constant, the angle $\theta_{src}$ can be easily calculated using Expression (5) on the basis of the discrete data.

In the measuring device 201 in the first embodiment, the axes 12-$m$ indicating the maximum sensitivity of the directivity of each of the plurality of ultrasonic sensors 10-$m$ intersect each other at the reference position 110 of the surface 11$a$ of the structural object 11 and are focused at one point at the reference position 110. According to the measuring device 201 in the first embodiment, since the angle Ta formed by the axes 12-$m$ and the normal 112 is constant and the reference positions 110 and 16 are clearly set, the angle $\theta_{src}$ can be easily calculated using Expression (4) on the basis of the discrete data.

Other Embodiments

A measuring method and a measuring device in a modified example of the first embodiment will be described below. In the following description, constituent elements of the modified example that are the same as the measuring method and the measuring device 201 in the first embodiment will be denoted by reference numerals that are the same as the first embodiment and duplicate description of the modified example and the first embodiment will be omitted.

In the measuring method and the measuring device 201 in the first embodiment, when a position of the occurrence source 120 in the structural object 11 in a plane including the X direction and the Y direction is estimated, both of the direction in which there is the occurrence source 120 (the direction from the detection position toward the occurrence source) when viewed from the reference position 16 in the sensor array and the distance L from the reference position 16 to the occurrence source 120 (the distance from the detection position to the occurrence source) can be estimated. Here, in the measuring method and the measuring device 201 in the first embodiment, if the position of the occurrence source 120 can be specifically identified using the information regarding either the direction in which there is the occurrence source 120 when viewed from the reference position 16, that is, the angle $\theta_{src}$ and the distance L, only one of the angle $\theta_{src}$ and the distance L may be estimated.

Figure 18:
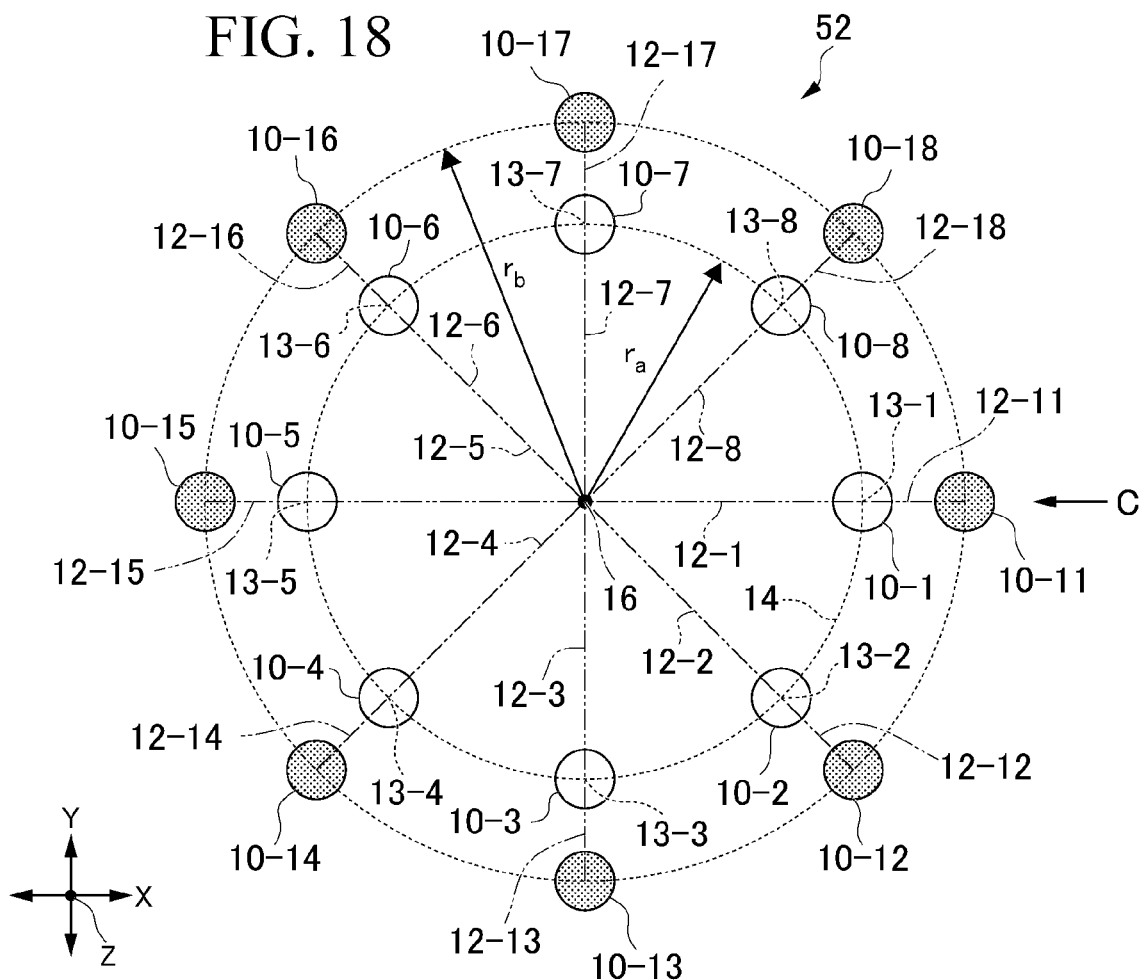
FIG. 18 is a plan view illustrating a modified example of the constitution of the sensor array of the measuring device in the first embodiment.
Figure 19:
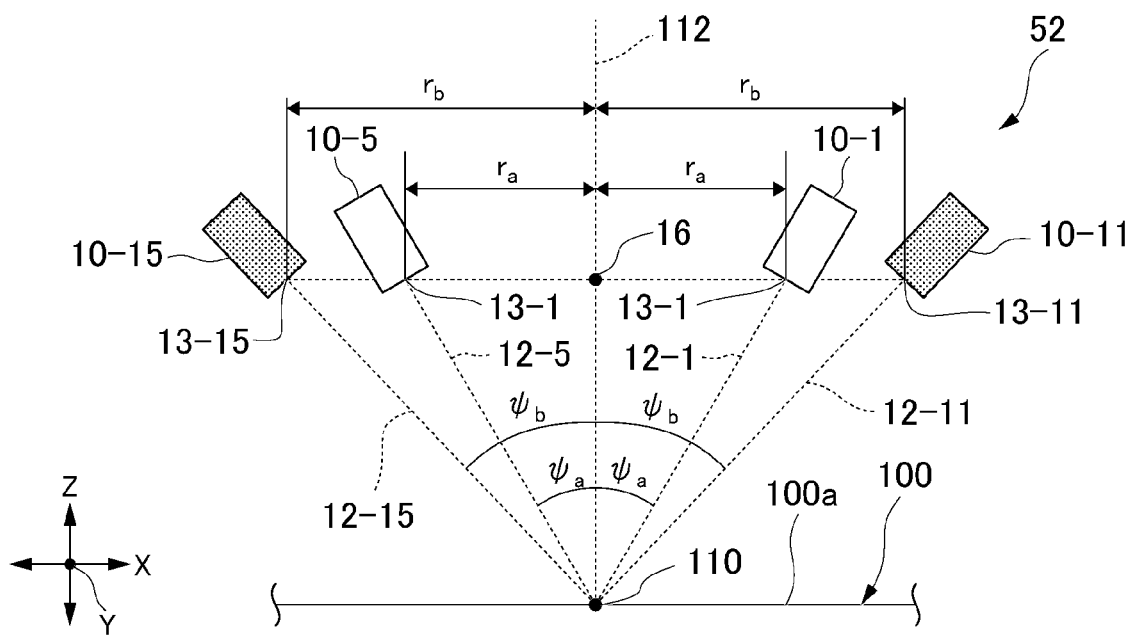
FIG. 19 is a side view of the sensor array when viewed from a Z direction at position C illustrated in FIG. 18.

As a modified example of the sensor array 51 included in the measuring device 201 in the first embodiment, a sensor array 52 shown in FIGS. 18 and 19 can be exemplified. As illustrated in FIG. 18, the plurality of ultrasonic sensors 10 may be disposed concentrically when viewed in a plan view with the reference position 16 as a center. That is to say, the sensor array 52 may include ultrasonic sensors 10-11 to 10-(10+q) having a total number of p separated by a distance $r_b$ different from a distance $r_a$ with the reference position 16 as a center and disposed in an annular shape, in addition to the ultrasonic sensors 10-1 to 10-$j$ separated by the distance $r_a$ with the reference position 16 as a center and disposed in an annular shape. In the specification, the ultrasonic sensors 10-(10+q) mean a (10+q)th ultrasonic sensor 10 corresponding to that of FIGS. 18 and 19. q is a natural number from 1 to p. Although j=p=8 is satisfied in FIG. 18, the total numbers j and p are not limited to 8, may be any total number of 2 or more, and may not be equal to each other. Axes 12-(10+q) indicating the maximum sensitivity of the directivity of the ultrasonic sensor 10-(10+q) intersect each other at the reference position 110 and form an angle $\Psi_b$ with respect to the normal 112 when viewed in a side view.

For example, when a velocity $v_{ae2}$ different from the velocity $v_{ae}$ is assumed in the velocity of the elastic waves in the solid material of the structural object 11 to be measured, it is preferable that the angle $\Psi_b$ satisfy the following Expression (11).

$$\psi_b = \arcsin\left(\frac{v_{air}}{v_{ae2}}\right) \quad (11)$$

As in the first embodiment, if a circle coordinate (r-θ coordinate) system in which a center of a virtual circle is a point of r=0 is considered, the coordinates of p ultrasonic sensors 10-(10+q) are represented by the following Expressions (12) and (13). An angle $\theta_b$ in Expressions (12) and (13) is an angle corresponding to the angle $\theta_a$ when the ultrasonic sensor 10-$m$ is replaced with the ultrasonic sensor 10-$q$, as can be seen with reference to FIG. 6C.

$$P_q:(r_b,n\theta_b)(q=1,\ldots,p) \quad (12)$$

$$\theta_b=2\pi/p \quad (13)$$

In an example of a constitution shown in FIGS. 18 and 19, the ultrasonic sensor 10-$m$ and the ultrasonic sensor 10-(10+p) are disposed at the same height in the Z direction. When the ultrasonic sensors 10-$m$ and 10-(10+p) are disposed at the same height as described above, the efficiency of an installation space can be improved.

In the sensor array 52, the ultrasonic sensor 10-$q$ (some sensors included in the plurality of sensors) is disposed at an angle (an inclination angle) $\Psi_b$ different from that of the ultrasonic sensor 10-$m$ (the remaining sensors) with respect to the normal 112 passing through the reference position 110 on the surface 11$a$ of the structural object 11. If the angle $\Psi_b$ is set in accordance with the propagation velocity $v_{ae}$ in the structural object 11 as in Expression (11), the sensor array 52 can detect two types of elastic waves having different propagation velocities in the structural object 11. If a plurality of ultrasonic sensors 10 are disposed in three or more concentric circle shapes with the reference position 16 as a center and an angle formed by the axis indicating the maximum sensitivity of the directivity of each ultrasonic sensor 10 and the normal 112 is set in consideration of the velocity of the elastic waves in the structural object 11, it is possible to detect three or more types of elastic waves having different propagation velocities in the structural object 11. Therefore, the number of concentric circles in which the plurality of ultrasonic sensors 10 are disposed about the reference position 16 may not have to be limited to a specific number.

A modified example of a constitution of a sensor array different from the sensor arrays 51 and 52 may be conceivable. If the angle formed by the axis indicating the maximum sensitivity of the directivity of each ultrasonic sensor 10 and the normal 112 is determined and the distance between the detection port of the elastic waves in each ultrasonic sensor 10 and the reference position 16 is determined, the height from the surface 11$a$ and the distances from the reference position 16 of the plurality of ultrasonic sensors 10 may be different from each other. For example, the plurality of ultrasonic sensors 10 may be disposed to draw a rectangular shape, an elliptical shape, a diamond shape, or any other shape when viewed in a plan view. For example, the plurality of ultrasonic sensors 10 may be disposed in a spiral shape when viewed in a side view.

In the measuring device 201 in the first embodiment, the sensor array 51 having the plurality of ultrasonic sensors 10 detects the sound waves 101 generated in the structural object 11 in a non-contact manner. For example, when the distance L is regarded to be infinite as described above, only one ultrasonic sensor 10 can detect the sound waves 101 in a non-contact manner. When the distance L is regarded to be finite, substantially two or more ultrasonic sensors 10 are required. In addition, in order to ensure the accuracy when a continuous function is fitted to discrete data, it is preferable to detect sound waves 101 by means of four or more ultrasonic sensors 10 in a non-contact manner and it is more preferable to detect sound waves 101 by means of eight or more ultrasonic sensors 10 in a non-contact manner. That is to say, in the measuring method and the measuring device in the first embodiment and other embodiment, the sound waves 101 can be detected in a non-contact manner using at least one or more ultrasonic sensors 10.

According to at least one embodiment described above, when the elastic waves generated in the structural object 11 formed of a solid material are detected using the sound waves 101 in a non-contact manner and the position of the occurrence source 120 of the elastic waves is estimated on the basis of the information regarding the intensity of the signal of the detected elastic waves, it is possible to increase a degrees of freedom of the object to be measured, the measurement range, or the measurement environment in which there is the occurrence source 120 of the elastic waves.

While some embodiments of the present invention have been described, these embodiments are presented as examples. The scope of the present invention is not limited to the described configurations and conditions of the some embodiments. Various other embodiment of the embodiments can be implemented and various omissions, replacements, and changes are possible without departing from the gist of the present invention. These embodiments and modifications thereof are included in the scope and the gist of the present invention as well as in the scope of the present invention described in the claims and the equivalent scope thereof.

What is claimed is:

1. A measuring method, comprising:
detecting sound waves radiated from point sound sources on a surface of a structural object formed of a solid material due to generation of elastic waves at an occurrence source inside the structural object and propagation of the elastic waves from the occurrence source to the surface at a plurality of positions based on a reference position in a non-contact manner; and
estimating a position of the occurrence source of the elastic waves by calculating a distance from the reference position to the occurrence source in a plan view on the basis of a relationship estimated by calculations in advance between variable distances and amplitude values of sound waves depending on azimuth angles of axes connecting each of the plurality of positions and the reference position with respect to a direction from the occurrence source toward the reference position, and on the basis of amplitude values of the detected sound waves depending on the azimuth angles.

2. The measuring method according to claim 1, wherein the amplitude values of the detected sound waves depending on azimuth angles are calculated from the following Equations (1) and (2):

$$\psi = \arcsin\left(\frac{v_{air}}{v_{ae}}\right), \quad (1)$$

$$\theta = \arccos\{1 - (\sin \psi)^2(1 - \cos \theta_{azm})\}, \quad (2)$$

$$\theta = \arccos\{1-(\sin \psi)^2(1-\cos \theta_{azm})\} \quad (2),$$

where:
$\psi$ represents an inclination angle of a tangent line of wavefronts of sound waves radiated from the point sound sources to the surface of the structural object,
$v_{air}$ represents a propagation velocity of the sound waves in the air,
$v_{ae}$ represents a propagation velocity of the elastic waves in the structural object,
$\theta$ represents an angle of a detection direction in which directivity of sensing the sound waves is highest respect to the direction from the occurrence source toward the reference position in a plan view, and
$\theta_{azm}$ represents the azimuth angle of each of the plurality of positions.

3. The measuring method according to claim 2, wherein, the method further comprises:
calculating continuous functions of plots of the amplitude values of sound waves depending on the variable distances based on Equations (1), (2) and the following Equation (3) to estimate the relationship between the variable distances and the amplitude values, and half-value widths of the continuous functions:

$$\theta_{azm} = \hat{\theta}_{src} - \arctan\left\{\frac{r \cdot \sin \hat{\theta}_{src}}{L + r \cdot \cos \hat{\theta}_{src}}\right\}, \quad (3)$$

where:
$\theta_{src}$ represents an angle that an axis connecting to the detection position of the sound waves and the reference position makes with respect to an axis parallel to one direction parallel to the surface of the structural object passing through the reference position in a plan view, and
the hat written above the angle $\theta_{src}$ indicates that the angle $\theta_{src}$ is an estimator; and
obtaining the distance by making half-value widths estimated from amplitude values of the detected sound waves depending on the azimuth angles fit to a calibration curve of the plots based on the continuous function; and wherein:
a plurality of azimuth angles used for detecting the sound waves in a discrete manner are detected;
information of an actual measurement function representing a change in the amplitude values with respect to the azimuth angle is acquired by fitting a continuous function to a plot of the amplitude values at each of the azimuth angles for the plurality of azimuth angles; and the direction from the detection position of the sound waves toward the occurrence source is detected on the basis of the information of the actual measurement function.

4. The measuring method according to claim 3, comprising:
   detecting the sound waves using at least one ultrasonic sensor having directivity in a non-contact manner; and
   using a directivity function based on a resonance frequency of the ultrasonic sensor and a vibrator radius of the ultrasonic sensor as the continuous function.

5. The measuring method according to claim 3, comprising:
   using a von Mises distribution function as the continuous function.

6. A measuring device, comprising:
   a sensor part having at least one sensor configured to detect sound waves radiated from point sound sources on a surface of a structural object formed of a solid material due to generation of elastic waves at an occurrence source inside the structural object and propagation of the elastic waves from the occurrence source to the surface at a plurality of positions based on a reference position in a non-contact manner; and
   a position estimation mechanism configured to estimate a position of the occurrence source of the elastic waves by calculating a distance from the reference position to the occurrence source in a plan view on the basis of a relationship estimated by calculations in advance between variable distances and amplitude values of sound waves depending on azimuth angles of axes connecting each of the plurality of positions and the reference position with respect to direction from the occurrence source toward the reference position, and on the basis of amplitude values of the sound waves detected by the sensor depending on the azimuth angles.

7. The measuring device according to claim 6, wherein the position estimation mechanism includes:
   a detection direction acquisition part configured to acquire information regarding a detection direction of the sound waves in each of the sensors included in the at least one sensor;
   an intensity acquisition part configured to acquire information regarding an intensity of a signal of the sound waves detected by each of the sensors; and
   an estimation part configured to calculate the amplitude values of sound waves depend on azimuth angles from the following Equations (1) and (2), $$\psi = \arcsin\left(\frac{v_{air}}{v_{ae}}\right), \tag{1}$$

$$\theta = \arccos\{1 - (\sin \psi)^2(1 - \cos \theta_{azm})\}, \tag{2}$$

where:
   $\psi$ represents an inclination angle of a tangent line of wavefront(s) of sound waves radiated from the point sound sources to the surface of the structural object,
   $v_{air}$ represents a propagation velocity of the sound waves in the air,
   $v_{ae}$ represents a propagation velocity of the elastic waves in the structural object,
   $\theta$ represents an angle of a detection direction in which directivity of sensing the sound waves is highest with respect to the direction from the occurrence source toward the reference position in a plan view, and
   $\theta_{azm}$ represents the azimuth angle of each of the plurality of positions.

8. The measuring device according to claim 7, wherein the position estimation mechanism includes:
   a detection angle acquisition part configured to acquire information regarding a plurality of azimuth angles of the sound waves discretely obtained by each of the sensors included in the at least one sensor; and
   a function acquisition part configured to acquire information of an actual measurement function representing a change in the amplitude values with respect to the azimuth angle by fitting a continuous function to a plot of the amplitude values at each of the azimuth angles with respect to the at least one azimuth angle,
wherein:
   continuous functions of plots of the amplitude values of sound waves depending on the variable distances are calculated based on Equations (1), (2) and the following Equation (3) to estimate the relationship between the variable distances and the amplitude values, and half-value widths of the continuous functions:

$$\theta_{azm} = \hat{\theta}_{src} - \arctan\left\{\frac{r \cdot \sin \hat{\theta}_{src}}{L + r \cdot \cos \hat{\theta}_{src}}\right\}, \tag{3}$$

where:
   $\theta_{src}$ represents an angle that an axis connecting to the detection position of the sound waves and the reference position makes with respect to an axis parallel to one direction parallel to the surface of the structural object passing through the reference position in a plan view, and
   the hat written above the angle $\theta_{src}$ indicates that the angle $\theta_{src}$ is an estimator;
   the distance is obtained by making half-value width estimated from amplitude values of the detected sound waves depending on the azimuth angles fit to a calibration curve of the plots based on the continuous function, and
   the estimation part estimates the direction from the sensor part toward the occurrence source and on the basis of the information regarding the actual measurement function.

9. The measuring device according to claim 8, wherein the sensor is an ultrasonic sensor capable of detecting ultrasonic waves and having directivity, and
   the continuous function is a directivity function based on a resonance frequency of the ultrasonic sensor and a vibrator radius.

10. The measuring device according to claim 8, wherein the continuous function is a von Mises distribution function.

11. The measuring device according to claim 6, wherein the sensor part has a plurality of sensors:
   some of the sensors included in the plurality of sensors are disposed at an inclination angle different from that of other sensors with respect to a normal of a surface of the structural object passing through the reference position.

12. The measuring device according to claim 6, wherein the sensor part has a plurality of sensors, and
   each of the sensors included in the plurality of sensors is disposed at a prescribed inclination angle with respect to a normal of the surface of the structural object passing through the reference position and disposed at a prescribed distance from the prescribed reference position when viewed in a plan view.

13. The measuring device according to claim 12, wherein the plurality of sensors are disposed:
    on a virtual circle centered at the reference position, or
    on virtual concentric circles centered on the reference position, when viewed in a plan view, or
    in a virtual spiral shape with the reference position as a virtual origin.

14. The measuring device according to claim 11, wherein axes indicating a maximum sensitivity of directivity of each of the sensors included in the plurality of sensors intersect each other at the reference position.

* * * * *